United States Patent [19]

McElreath

[11] Patent Number: 4,645,141
[45] Date of Patent: Feb. 24, 1987

[54] AUTOMATIC FLIGHT CONTROL SYSTEM

[75] Inventor: Kenneth W. McElreath, Cedar Rapids, Iowa

[73] Assignee: Rockwell International Corporation, El Segundo, Calif.

[21] Appl. No.: 613,660

[22] Filed: May 23, 1984

[51] Int. Cl.⁴ .............................................. B64C 13/22
[52] U.S. Cl. ................................ 244/17.13; 244/76 R; 244/180; 244/182; 364/432; 364/433
[58] Field of Search ................ 244/17.13, 75 R, 76 R, 244/180, 182, 177, 196, 197, 192; 318/584, 591; 364/432, 433

[56] References Cited

U.S. PATENT DOCUMENTS 3,482,805 12/1969 Knemeyer ......................... 244/17.13
3,510,092 5/1970 Hendrick, et al. ................... 318/584

FOREIGN PATENT DOCUMENTS 2081474 2/1982 United Kingdom ............. 244/17.13

Primary Examiner—Trygve M. Blix
Assistant Examiner—Rodney Corl
Attorney, Agent, or Firm—George A. Montanye; Robert C. Mayes; H. Fredrick Hamann

[57] ABSTRACT

There is disclosed a system and technique which enables an aircraft (helicopter or VTOL) to be more easily controlled for maintaining precise position or velocity in a hover condition. The system includes operational logic and decision making circuitry which reduces pilot workload by sensing pilot intent based upon the control stick movement and mode selection of the aircraft. The system will automatically hold a given hover position, automatically hold a given hover velocity (ground speed), or allow the aircraft to be manually maneuvered to a new desired hover position or velocity. The system also enables the aircraft to either hold a new velocity or return to a previous velocity. This is all controlled through the automatic flight control system and by sensing the force or displacement of a pilot's control stick in the aircraft. Upon release of the manual force applied by the pilot to the control stick, the stick returns to a neutral position and the control logic recognizes pilot intent to maintain a given hover velocity or position.

6 Claims, 2 Drawing Figures

AUTOMATIC FLIGHT CONTROL SYSTEM

BACKGROUND OF THE INVENTION

The present invention relates to aircraft control systems and, more particularly, to automatic flight control systems which allow normal manual maneuvering as well as automatic hover position and hover velocity control.

As the complexity of aircraft control systems increases, particularly in connection with helicopter and similar VTOL aircraft, there is an increasing need to provide systems which lessen pilot workload during aircraft operation. While automatic control systems for selectively providing automatic hover velocity control or hover position control have been known for some time, such systems have required the manual selection of a hover velocity hold condition or a hover position hold condition. As a result, the pilot must consciously make selections during aircraft maneuvering which require other than normal stick control if either one of the modes of operation is to be achieved. In high workload environments, this increases the level of attention that the pilot must provide to maintain safe operation of the aircraft.

The present invention has therefore been developed to overcome the shortcomings of the above known and similar techniques and to provide a system and technique which allows normal manual control during automatic flight, yet provides an improved transition to maintain hover position hold or hover velocity hold with natural pilot movements.

SUMMARY OF THE INVENTION

In accordance with the present invention, a control technique and system is disclosed which allows the pilot to manually control an aircraft by displacing the control stick to provide manual flythough control and automatically return to hover position hold or a hover velocity hold with only a natural release of the control stick. The system includes conventional velocity hold synchronizing circuitry and conventional position hold circuitry which provide a control signal output in accordance with predetermined logic functions that select a position hold or velocity hold mode of operation. In a hover mode where position hold is desired, release of the aircraft control stick will result in position hold once aircraft speed is less than a predetermined threshold. In the same hover mode, the system can also be operated to select a velocity where release of the control stick results in the maintenance of that selected velocity. In both cases, release of the control stick causes the automatic return of the system to a position or velocity hold while movement of the control stick still allows manual flythrough control.

It is therefore a feature of the invention to provide an aircraft automatic control system which reduces pilot workload.

It is a further feature of the invention to provide an automatic control system which includes a hover control allowing position and velocity hold in response to control stick release.

It is a yet further feature of the invention to provide an automatic position and velocity hold in a hover mode of aircraft control which allows manual pilot flythrough as well as a return to position or velocity hold upon release of the control stick.

Still another feature of the invention is to provide automatic hover control in vertical speed and altitude which is responsive to natural pilot control stick displacement.

These and other advantages and novel features will become apparent from the following detailed description when considered with the accompanying drawings wherein:

DETAILED DESCRIPTION OF A PREFERRED EMBODIMENT

Figure 1:
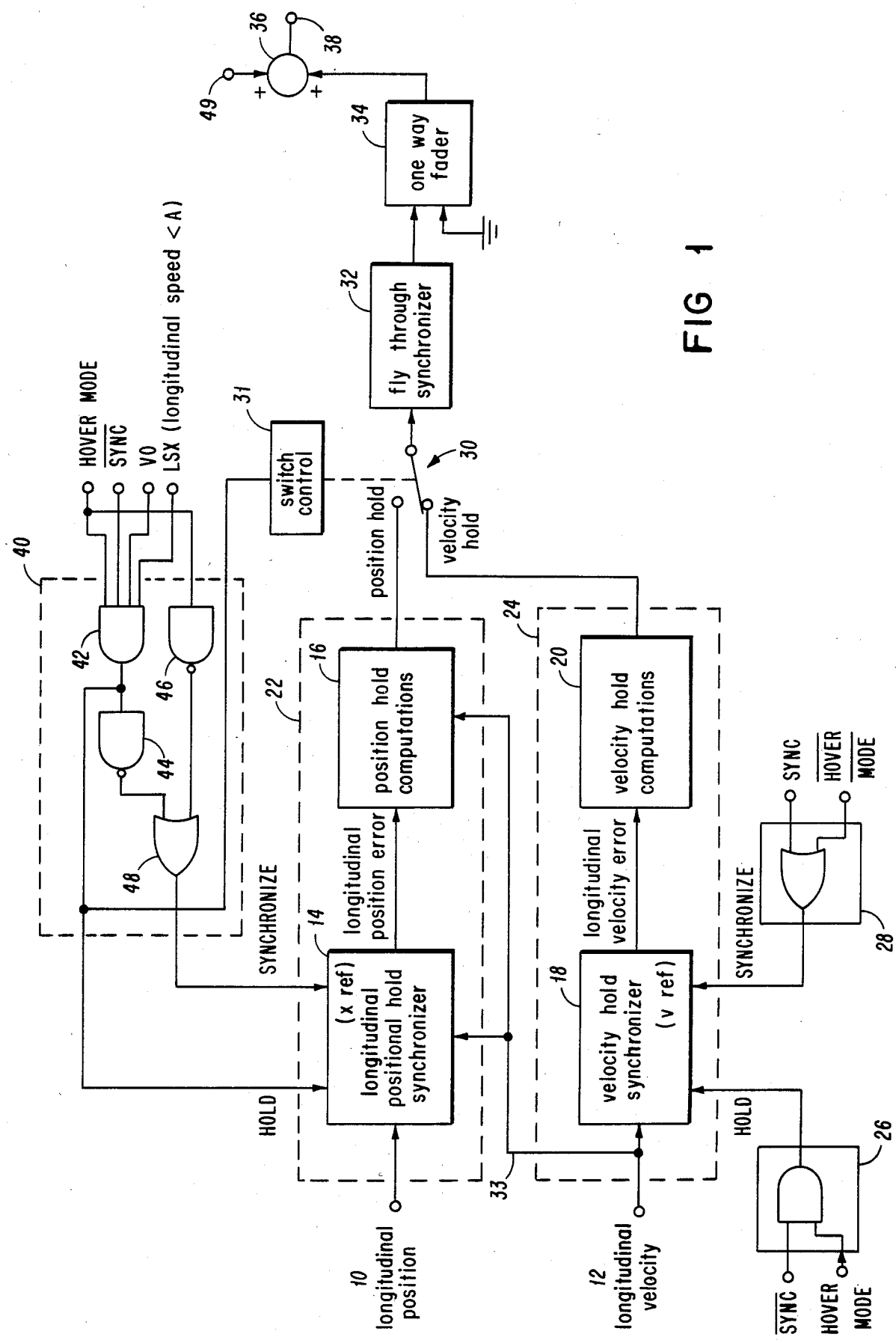
FIG. 1 is a schematic diagram illustrating one embodiment of the invention related to the longitudinal or lateral hover control circuitry for maintaining position and velocity hold of an aircraft.

Referring now to the drawings, wherein like numerals are used to show like elements throughout, there are shown preferred embodiments of the hover control system in accordance with the present invention. For purposes of the description herein, reference will be made to a conventional helicopter control system which includes an automatic flight control system (AFCS). The AFCS system provides a variety of well-known variables and control signals that will not be otherwise described except in connection with the operation of the present invention. While the inventive system is specifically described with respect to a helicopter control, it will be appreciated that the same is applicable to any aircraft control of the helicopter or VTOL type where automatic hover mode control is desired in either the longitudinal, lateral or vertical directions.

By way of background, it will be noted that the AFCS of the aircraft includes a mode selection switch which will be designated as the HOVER MODE and includes a control stick having a button known as the SYNC button and sensors which automatically sense the displacement force of the control stick to distinguish displacement from a neutral position. The aircraft control stick is also known to be biased so that it returns to a neutral position upon release by a pilot. Furthermore, the automatic control system provides various signals which will be referenced throughout, including sensors which provide actual position signals, velocity signals, etc. For purposes of this description, the signals shown in the drawings identified by capital letters without a line above them represent the presence of a logic signal indicating that function (e.g., logic "1"), while the same capital letters with a line above them represent the conventional logic "not" (e.g., logic "0"), meaning the logic opposite or absence of a signal representing that function.

Referring first to FIG. 1, a signal representing actual aircraft position along an axis is provided as input to terminal 10 while a signal representing actual aircraft velocity along an axis is provided at terminal 12. In the present example, the axis illustrated is the longitudinal aircraft axis although it will be apparent that the inventive techniques are equally applicable to the lateral aircraft axis. The signal representing actual longitudinal position at 10 is coupled to conventional position control circuitry 22 which includes a longitudinal position hold synchronizer 14 having its output coupled to position hold computation circuitry 16. Likewise, the longitudinal velocity signal at 12 is coupled to conventional velocity control circuitry 24 including velocity hold synchronizer 18 which has its output coupled to velocity hold computation circuitry 20. In the prior art, the use of the longitudinal position control circuitry 22 must be manually selected to obtain a longitudinal position hold and the use of the velocity hold circuitry 24 must be manually selected to provide velocity control. Thus, during aircraft operation, the pilot must divert his attention to specific control functions, namely position or velocity hold, and make the selection necessary to implement that function while continuing to maintain manual control of the control stick.

In accordance with the present invention, the present system includes a HOVER MODE signal which, once selected, will allow automatic control to obtain both velocity hold and position hold. In particular, there is provided a velocity hold logic circuit 26 and a velocity synchronize logic circuit 28 which are coupled to control the conventional velocity reference $V_{REF}$ of the velocity hold synchronizer 18. As is known, in the hold position, $V_{REF}$ is selected to be a value which causes a longitudinal velocity error signal from 18 which is used in 20 to compute the velocity control signal necessary to maintain the velocity required $V_{REF}$. That velocity control signal is provided as an output from 20 through a switch 30 having a contact movable between a velocty hold and position hold positions. In the velocity hold position, the velocity signal from 20 is coupled through synchronizer 32, one-way fader 34 and adder 36 to provide a signal at terminal 38 which controls, in this instance, the longitudinal control servo to maintain velocity by the longitudinal control servo. In the hold position, $V_{REF}$ is controlled so that it tracks the actual aircraft velocity so that there is a zero longitudinal velocity error signal from 18 and thus no error signal at the output of 18 during that time. The inputs to logic circuit 26 are the HOVER MODE signal and the SYNC button signal which are coupled through an AND-gate to cause the selection of the proper $V_{REF}$ in circuit 18 as described. Likewise, the synchronize logic circuit 28 includes a SYNC signal and a $\overline{\text{HOVER MODE}}$ signal coupled through an OR-gate to provide a signal output which causes $V_{REF}$ to track actual velocity and maintain a longitudinal velocity error of zero.

The position hold synchronizer and computation circuits 14 and 16 of the position hold control circuitry 22 operate in a similar manner. In this regard, hold and synchronize inputs are provided from logic control circuit 40 which cause the longitudinal position reference $X_{REF}$ to be a selected value for maintaining aircraft position, or to track the actual position so that there is no longitudinal position error at the output of 14. When an error signal is produced from 14, the computations provided by circuit 16 produce a position control signal that is coupled through the contacts of switch 30 when those contacts are in the position hold position. At that time the position control signal is coupled through synchronizer 32, fader 34, and adder 36 to output 38 which again is coupled to the longitudinal control servo to control longitudinal position.

The hold and synchronize inputs to the circuit 14 are provided through logic circuit 40. This logic circuit includes a HOVER MODE input signal, a SYNC button input signal, a signal VO representing a zero $V_{REF}$, and a longitudinal speed signal LSX, wherein LSX represents a longitudinal speed of less than a predetermined value (A) and $\overline{\text{LSX}}$ represents a longitudinal speed greater than a predetermined value. As will be appreciated, each of the aforementioned signals and others coupled as shown represent digital logic signals for use with the described logic. Each of the aforementioned signals are coupled to the AND-gate 42 having a HOLD output representing the hold function for controlling circuit 14. The HOLD output from 42 is coupled to a NAND-gate 44 to provide an inverse logic signal. Likewise, the HOVER MDDE signal is coupled to NAND-gate 46 to provide the inverse logic signal as an input to OR-gate 48 along with the inverse logic signal from 44. Thus, a logic SYNCHRONIZE output from 48 will be provided to select the synchronize function in circuit 14 when there is a $\overline{\text{HOLD}}$ or $\overline{\text{HOVER MODE}}$ input to 48 as represented by the output of 46.

Additionally, as is conventional, there is a manual flythrough command input signal (pilotage control signal) which overrides the control provided by position and velocity hold circuits 22 and 24. Thus, when a force is applied to the control stick, this force is detected and the command provided by the signal at 49 is coupled through adder 36 and used as the output at terminal 38 to provide the longitudinal control servo and thus manual aircraft control. When the aircraft speed exceeds the selected threshold, $\overline{\text{LSX}}$ causes the position hold synchronizer 14 to synchronize $X_{REF}$. Likewise, when the pilot control stick is released and goes to the neutral position, the control signals from position or velocity control circuits 22 and 24 are selected dependent through switch 30 to maintain position or a given velocity. The control switch position 30 is such that position hold is maintained if there is a HOLD signal output at AND-gate 42 and velocity hold is maintained if there is a $\overline{\text{HOLD}}$ signal output from AND-gate 42.

It should also be understood that the flythrough synchronizer 32 is of conventional construction and may be, for example, that shown in block 102 of the figure of co-pending application Ser. No. 394,360 by J. P. Centala et al., entitled "Automatic Flight Control with Pilot Flythrough", assigned to the same assignee as the present invention and incorporated herein by reference in its entirety. As will be seen, the output connection from 102 in the aforementioned application is provided through a one-way fader 80 which is equivalent to one-way fader 34 of FIG. 1 of the present invention. Each of these elements are thus conventional and their detailed description is unnecessary for a further understanding of the present invention. It will be recognized however, that the flythrough synchronizer 32 and one-way fader 34 are coupled to allow a smooth transition from the manual flythrough command provided at terminal 49 to the command provided by either the position or velocity control signals from circuits 22 and 24, respectively.

Referring again to FIG. 1, the operation of the system will be described in connection with the control of a helicopter during flight. Initially, prior to the HOVER MODE selection, the velocity reference $V_{REF}$ is set to zero. The logic SYNCHRONIZE output from 48 causes $X_{REF}$ in 14 to be synchronized with the actual position as a result of the inverse of the $\overline{\text{HOLD}}$ signal provided by NAND-gate 44 to OR-gate 48. Thereafter, upon a decision to go into a hover mode, the pilot makes a selection and the HOVER MODE signal is coupled to the indicated inputs. Upon selection of the hover mode, velocity hold computations in 20 are faded in smoothly through the switch 30 which is normally biased in the velocity hold position. Those computations provide the veloity control signal which is coupled through circuits 32 and 34 and thence to the output 38.

When the aircraft control stick is released to a neutral position, the longitudinal velocity will be gradually brought to a zero groundspeed by the smoothing and fading of elements 32 and 34. Upon reaching a longitudinal velocity of less than a given threshold (e.g., two knots), the LSX signal, along with the other signal inputs to AND-gate 42, produce a $\overline{\text{SYNCHRONIZE}}$ signal at the output of 48 and a HOLD signal at the output of 42 causing te circuit 14 to develop an error signal so that the circuit 16 computes the position signal necessary to maintain aircraft position. At the same time, the HOLD signal from 42 causes a switch control 31 to control switch 30 so that the position hold output from 16 is coupled through the smooth-in flythrough synchronizer 32, one-way fader 34, and thence through adder 36 to output 38. This removes the velocity control signal and causes the system to provide a position hold. It should also be noted that the longitudinal velocity input at 12 is coupled over line 33 to the position hold synchronizer 14 and position hold computation circuit 16 to provide damping in a conventional fashion to provide stability for position control. As a result, the position control signal from 16 through switch 30 will maintain an automatic hold of the aircraft in a predetermined hover position until the control stick is moved again. At that time, the flythrough command at 49 allows manual control to be resumed.

In connection with the above, it will be recognized that as long as the longitudinal speed is less than a predetermined value and the other signal conditions are met at the input of AND-gate 42, the output at 42 will maintain the HOLD command. Thereafter, if the longitudinal speed is changed by manual control to produce the $\overline{\text{LSX}}$ signal, the output from AND-gate 42 will switch to $\overline{\text{HOLD}}$ thereby terminating the hold and causing synchronization of position reference $X_{REF}$. At the same time, the switch 31 will allow the switch 30 to return to the normal velocity hold position. Likewise, if the SYNC button is pushed or the $V_{REF}$ signal is other than zero, the same termination of the HOLD signal of the output 42 will cause the position hold circuitry 22 to go into the synchronize mode and cause the contact of switch 30 to return to the velocity hold position. A deselection of the hover mode will produce a $\overline{\text{HOVER MODE}}$ signal and cause the identical result.

As will be appreciated, therefore, whenever the pilot flies through, the position hold reference $X_{REF}$ is synchronized by the output provided from OR-gate 48 for the reasons noted above. However, the velocity hold produced by velocity circuit 24 is not. Accordingly, when the control stick is released terminating the flythrough input at 49, the flight control system commands the aircraft to acquire the old velocity reference $V_{REF}$. As will be remembered, the initial velocity reference was equal to zero. If that reference remains zero, then the flight control system reverts to the position hold operation as was described above upon a decrease of aircraft velocity to less than the threshold of two knots.

In order to change the velocity reference so that the aircraft will maintain a predetermined velocity rather than a predetermined position, a sync button located on the aircraft control stick must be momentarily pressed to produce the SYNC signal while the aircraft velocity is greater than the predetermined threshold value of velocity. Accordingly, during flythrough, the SYNC button will be depressed and this in connection with the $\overline{\text{HOVER MODE}}$ signal from hold circuit 26 will produce a velocity reference in velocity hold synchronizer 18 which produces a longitudinal velocity reference $V_{REF}$ indicative of the aircraft groundspeed at the time the SYNC button is pushed. Thereafter, when the control stick is again released and returns to a normal position, the velocity hold circuit 18 will produce a longitudinal velocity error signal output to computational circuit 20 that in turn provides a signal through switch 30, flythrough 32, fader 34 and adder 36 to control the longitudinal control servo to maintain a fixed longitudinal velocity. Since the $\overline{\text{LSX}}$ input will be maintained at AND-gate 42, the HOLD output from the AND-gate 42 is prohibited and the position hold synchronizer synchronizes the position reference $X_{REF}$ rather than holding that reference. Any further pilot flythough and subsequent release of the control switch will likewise result in a return to the prior velocity until the SYNC button is again pushed at a different velocity (or $V_{REF}$ is otherwise changed in a conventional fashion). Also, in order to return to a position hold mode, the SYNC button must be pushed while the velocity is less than the predetermined threshold (or $V_{REF}$ must be set to zero).

As will be appreciated from the above, the described control circuitry allows an aircraft to maintain a stationary hover or to maintain a selected longitudinal velocity. The logic circuitry implementing the system allows natural pilot interaction to change the hover conditions at will. This is accomplished by control of the SYNC button in connection with normal aircraft control such that release of the control stick to a neutral position will result in the desired action.

In accordance to the above, upon initial selection of the hover mode, the automatic flight control system transitions the helicopter to zero longitudinal groundspeed regardless of the initial helicopter velocity. If the pilot desires a different hover groundspeed reference, then he flies through with the normal control and establishes the desired groundspeed. At that time, he momentarily depresses the sync button on the control stick and releases the control force on the stick. The automatic control system will then hold the current hover velocity. If the pilot does not intervene by pressing the sync button, the automatic flight control system will slow the aircraft to zero groundspeed. When the groundspeed is less than the selected threshold (e.g. two knots), the AFCS will then hold the current hover position. It should be recognized, that the circuitry for both lateral and longitudinal position is separate, even though identical in configuration. Accordingly, lateral and longitudinal position and velocity can be held and controlled independently. Once the aircraft has attained a fixed position, the pilot may fly through using the control stick to command the move to a new position. At this point, release of the control stick will again smoothly fade the aircraft velocity to zero and upon reaching the point of less than two knots, the automatic flight control system will switch the position of switch 30 to a hover hold position and maintain the new hover position.

It will be readily understood that the logic control of the present invention allows the pilot to change the hover velocity by use of the SYNC button and thereafter have the automatic flight control return the aircraft to that velocity upon release of the control stick. Alternatively, a separate adjustment can be used to set the reference velocity to that which the pilot would like to move. This can be accomplished and still retain automatic position control as described since the position hold is automatically engaged any time the reference velocity $V_{REF}$ is zero and the actual aircraft velocity is less than the predetermined threshold.

Figure 2:
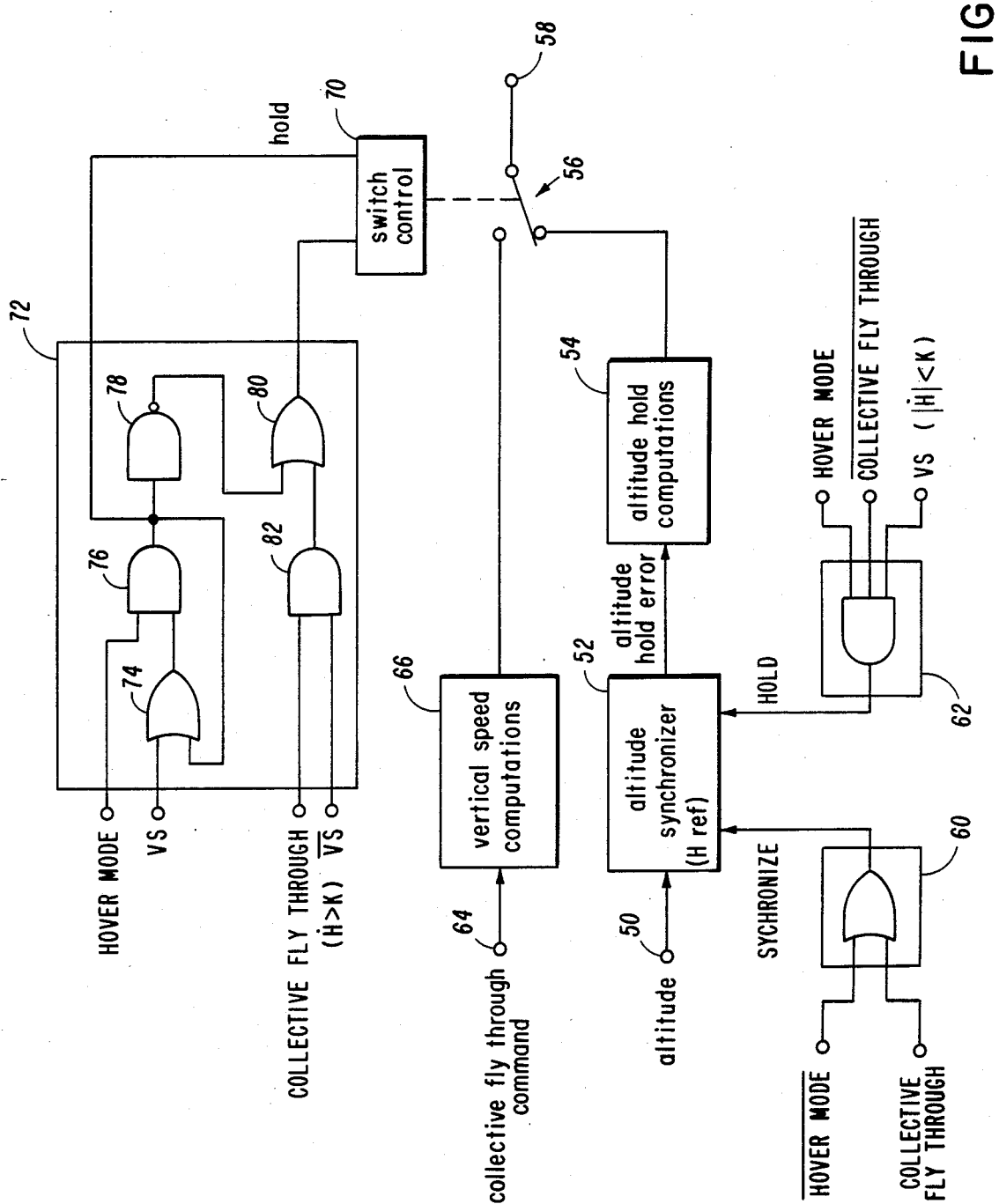
FIG. 2 is a schematic diagram showing another embodiment of a hover control system applicable to the control of vertical speed and altitude.

In the vertical axis, a similar control can be exercised in a somewhat less complex fashion since the flythrough command itself represents a vertical speed proportional to the pilot's force or displacement of a conventional collective control command signal. In FIG. 2, such a technique for vertical control is schmatically illustrated and will be briefly described, it being recognized that similar logic control and operation is achieved. In connection with this embodiment, a signal representing processed altitude is provided as an input at 50 to altitude synchronizer 52 which in turn provides an altitude hold error to the altitude hold computation circuit 54. An altitude hold control signal is coupled through a switch 56 having an altitude hold position and a collective flythrough position. The output from switch 56 at terminal 58 is then coupled to the AFCS collective control servo for control in the vertical axis. Altitude synchronizer 52 receives inputs from logic circuits 60 and 62 which set the vertical velocity reference ($H_{REF}$) in altitude synchronizer 52. Synchronizer logic 60 receives a signal representing $\overline{\text{HOVER MODE}}$ and COLLECTIVE FLYTHROUGH coupled to an OR-gate to produce an output $H_{REF}$ which causes the altitude hold error to be zero from synchronizer 52. Logic circuit 62 includes an AND-gate having HOVER MODE, $\overline{\text{COLLECTIVE FLYTHOUGH}}$, and a VS signal coupled as inputs, where VS represents a rate of change of vertical speed ($|H|$) of less than a predetermined value K, and $\overline{\text{VS}}$ represents a rate of change of vertical speed greater than K.

In this embodiment, the collective flythrough command signal is provided at terminal 64 and thence through a conventional vertical speed computational circuit 66 to produce a signal representing the desired vertical speed. When this output is provided through switch 56 in the collective flythrough through position, the signal at 58 will control the vertical AFCS collective control servo.

The switch 56 is controlled by a switch control 70 which is responsive to logic circuit 72 including a plurality of logic inputs. The inputs include a HOVER MODE signal, a VS signal, as well as a COLLECTIVE FLYTHROUGH and $\overline{\text{VS}}$ signal. The HOVER MODE signal is coupled to an AND-gate 76 while the VS signal is coupled as input to OR-gate 74 along with the output of AND-gate 76. The output of OR-gate 74 is coupled as a second input to AND-gate 76. Thus, upon an output at AND-gate 76, an altitude HOLD signal will be provided to control switch control 70 to bias switch 56 into an altitude hold position. The HOLD output from AND-gate 76 produces a latch through OR-gate 74 which latches the altitude hold.

Conversely, the COLLECTIVE FLYTHROUGH input and the $\overline{\text{VS}}$ input are coupled to AND-gate 82 which has its output coupled to OR-gate 80 to provide an output for causing switch control 70 to bias switch 56 in the collective flythrough position. Alternatively, the absence of an altitude HOLD signal at the output of AND-gate 76 by coupling through NAND-gate 78 will also produce an output at OR-gate 80 causing bias of switch 56 to the collective flythrough position. Thus, in a manner similar to that described with respect to FIG. 1, the altitude hold command through circuit 62 is engaged automatically whenever manual control of the collective flythrough input is released while the AFCS is in the HOVER MODE and the vertical speed is a value of less than a fixed value K (e.g., ±1 feet/second). Again, flythrough of that hover position is allowed and a return to hover hold will occur each time the vertical velocity falls below the set value.

As will be appreciated from the above description, regardless of whether an aircraft is being operated in the longitudinal, lateral or vertical direction, an automatic return to a position hold hover condition can be achieved. Likewise, in the lateral or longitudinal direction, an automatic return to a predetermined velocity can be achieved. This can all be accomplished with only a release of the aircraft control stick. This mode of operation reduces the necessity for the pilot to specifically initiate position hold commands at given times and thus reduces the workload in connection with aircraft operation. These are features which clearly are not shown in the prior art.

Obviously, many other modifications and variations of the invention are possible in light of the above teachings. By way of example, the specific logic circuits are only illustrated as examples of the logic control exercised and could be implemented in any other fashion. Also, the synchronize and hold functions in the altitude synchronizer are constructed such that a conventional latch will occur to hold one condition until the alternative logic condition is met. It is therefore to be understood that within the scope of the appended claims, the invention may be practiced otherwise than as specifically described.

What is claimed is:

1. An aircraft control system comprising:
   control means movable between a neutral position and a control position for providing an aircraft pilotage control signal in said control position;
   means for providing a position signal representing aircraft position;
   means for providing a velocity signal representing aircraft velocity;
   means responsive to said position signal and a reference position signal for generating a position control signal for maintaining aircraft position;
   means responsive to said velocity signal and a reference velocity signal established independent of control means displacement from a neutral position for providing a velocity control signal for maintaining aircraft velocity;
   means responsive to aircraft velocity for selectively providing one of said position control signal and said velocity control signal as a selected signal; and
   means for controlling said aircraft in response to said aircraft pilotage control signal when said control means is in a control position and for controlling said aircraft in response to said selected signal when said control means is in said neutral position.

2. The system of claim 1 further comprising:
   means for causing said reference velocity signal to be fixed at a predetermined value in response to a first signal and to synchronize with aircraft velocity in response to a second signal; and
   means responsive to a third signal for causing said position reference signal to be fixed at a predetermined value and responsive to a fourth signal for synchronizing said position reference signal with aircraft position.

3. The system of claim 1 wherein said means for selectively providing is a switch normally biased to provide said velocity control signal.

4. The system of claim 2 wherein said means responsive to said third signal fixes said position reference signal value at the aircraft position sensed when aircraft velocity is less than a predetermined amount and synchronizes said position reference signal when aircraft velocity is greater than said predetermined amount.

5. In an automatic helicopter control system including an automatic flight control system which controls aircraft movement in an axial direction, the improvement in said system comprising:

control means having a neutral position and a control position for providing an output representing an axial pilotage control signal, said means being biased to a neutral position which terminates said axial pilotage control signal;

means for providing a position signal representing helicopter position along said axial direction;

means for providing a velocity signal representing helicopter velocity along said axial direction;

means for providing a position reference signal;

means for providing a velocity reference signal independent of control means displacement from a neutral position;

means responsive to said position signal and said position reference signal for providing a position control signal;

means responsive to said velocity signal and said velocity reference signal for providing a velocity control signal;

means responsive to aircraft velocity for selecting one of said position control signal and said velocity control signal; and means coupled to provide said axial pilotage control signal to said automatic flight control system in response to said control means being in said control position and for providing said selected one of said position control signal and said velocity control signal to said automatic flight control system in response to said control means being in said neutral position.

6. In an automatic helicopter control system including an automatic flight control system which controls helicopter movement in an axial direction, the improvement in said system comprising:

control means having a neutral position and a control position for providing an output representing an axial pilotage control signal, said means being biased to a neutral position which terminates said axial pilotage control signal;

means for providing a position signal representing helicopter position along said axial direction;

means for providing a velocity signal representing helicopter velocity along said axial direction;

means for providing a position reference signal;

means for providing a velocity reference signal;

means responsive to said position signal and said position reference signal for providing a position control signal;

means responsive to said velocity signal and said velocity reference signal for providing a velocity control signal;

means for providing a synchronization signal;

means for providing a hover mode signal;

means responsive to the presence of said hover mode signal and the absence of said synchronization signal for producing a first signal;

means responsive to the presence of said synchronization signal or the absence of said hover mode signal for providing a second signal;

means for causing said velocity reference signal to be fixed at a predetermined value in response to said first signal and for causing said velocity reference signal to synchronize with helicopter velocity in response to said second signal;

means responsive to a third signal for causing said position reference signal to be fixed at a predetermined value representing the helicopter position sensed when helicopter velocity is less than a predetermined amount and responsive to a fourth signal for synchronizing said position reference signal with helicopter position when helicopter velocity is greater than said predetermined amount;

means responsive to helicopter velocity for selecting one of said position control signal and said velocity control signal; and means coupled to provide said axial pilotage control signal to said automatic flight control system in response to said control means being in said control position and for providing said selected one of said position control signal and said velocity control signal to said automatic flight control system in response to said control means being in said neutral position.

* * * * *